United States Patent
Jacobsen

(10) Patent No.: US 7,609,616 B2
(45) Date of Patent: *Oct. 27, 2009

(54) SPARSE CHANNEL ESTIMATION FOR ORTHOGONAL FREQUENCY DIVISION MULTIPLEXED SIGNALS

(75) Inventor: Eric A. Jacobsen, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 223 days.

This patent is subject to a terminal disclaimer.

(21) Appl. No.: 11/750,039

(22) Filed: May 17, 2007

(65) Prior Publication Data

US 2007/0223610 A1  Sep. 27, 2007

Related U.S. Application Data

(63) Continuation of application No. 09/852,376, filed on May 10, 2001, now Pat. No. 7,230,911.

(51) Int. Cl.
*H04J 11/00* (2006.01)
(52) U.S. Cl. ..................................... 370/208
(58) Field of Classification Search ........................ None
See application file for complete search history.

(56) References Cited

U.S. PATENT DOCUMENTS

| | | | |
|---|---|---|---|
| 5,982,327 A | 11/1999 | Vook et al. | |
| 6,625,111 B1 | 9/2003 | Sudo | |
| 6,765,969 B1 | 7/2004 | Vook et al. | |
| 6,768,713 B1 | 7/2004 | Siala et al. | |
| 6,888,789 B1 * | 5/2005 | Sakoda et al. | 370/208 |
| 7,224,741 B1 * | 5/2007 | Hadad | 375/260 |
| 7,230,911 B2 * | 6/2007 | Jacobsen | 370/208 |
| 7,336,601 B2 * | 2/2008 | Wu et al. | 370/208 |

(Continued)

FOREIGN PATENT DOCUMENTS

WO    WO-99/01956    1/1999

(Continued)

OTHER PUBLICATIONS

Cochet, P. Y., et al., "Digital Transform for a Selective Channel Estimation (Application to Multicarrier Data Transmission)", *Communications, 1998 IEEE Int'l Conf on* Atlanta, GA, (Jun. 7-11, 1998),349-354.

(Continued)

*Primary Examiner*—Anh-Vu Ly
(74) *Attorney, Agent, or Firm*—Schwegman, Lundberg & Woessner, P.A.

(57) ABSTRACT

A computationally efficient channel estimation technique for use within an orthogonal frequency division multiplexing (OFDM) communication system determines coefficients of a channel transfer function by calculating the dot products of a pilot vector and a plurality of interpolation vectors. One dot product is preferably calculated for each subcarrier of interest within the system. The pilot vector is extracted from an OFDM symbol received from a communication channel. In a preferred approach, a number of interpolation vectors are precalculated and stored within a communication device for subsequent use during channel estimation and equalization operations. The technique is highly flexible and can be implemented using, for example, a variable user block size or a variable pilot vector size.

17 Claims, 5 Drawing Sheets

U.S. PATENT DOCUMENTS

2001/0036235 A1  11/2001  Kadous
2001/0055296 A1  12/2001  Akiyama
2002/0122381 A1   9/2002  Wu et al.

FOREIGN PATENT DOCUMENTS

WO    WO-02093860 A1   11/2002

OTHER PUBLICATIONS

Zhao, Yuping, "A Novel Channel Estimation Method for OFDM Mobile Communication Systems Based on Pilot Signals and Transform-Domain Processing", *Vehicular Technology Conference*, (1997).

"International Application No. PI 20021452 Office Action dated Dec. 30, 2007", 3 pgs.

* cited by examiner

SPARSE CHANNEL ESTIMATION FOR ORTHOGONAL FREQUENCY DIVISION MULTIPLEXED SIGNALS

RELATED APPLICATION(S)

This application is a continuation of U.S. application Ser. No. 09/852,376 filed on May 10, 2001 now U.S. Pat. No. 7,230,911, which is incorporated herein by reference.

FIELD OF THE INVENTION

The invention relates generally to communication systems and, more particularly, to techniques and structures for performing channel estimation in such systems.

BACKGROUND OF THE INVENTION

After a communication signal has traveled through a communication channel, equalization is often performed on the received signal to remove channel effects from the signal. One of the channel effects that often needs to be removed is intersymbol interference (ISI). In a wireless communication system, ISI is typically present in the form of multipath interference. That is, a transmit signal travels through the wireless channel via multiple different paths that each have a different channel delay. For example, one signal component may travel in a direct path from the transmitter to the receiver while one or more other signal components are reflected from objects in the surrounding environment toward the receiver. As can be appreciated, the signal component that travels directly to the receiver will typically be the first to arrive at the receiver and have the largest amplitude. The reflected components will typically arrive at the receiver sometime later and have smaller amplitudes. Although smaller in amplitude, the reflected signals can interfere with the direct signal making it more difficult to accurately detect the data therein. Equalization is thus used in the receiver to reduce or eliminate the negative channel effects from the received signal to improve the likelihood of accurate detection.

In most equalization techniques, an estimate of the present channel response is first determined. The channel estimate is then used to process the received signal to remove the negative channel effects. The channel estimation process is often a computationally complex and time consuming process. That is, performance of such processes will often consume a large percentage of system resources and may introduce undesirable delays in the receiver processing. As can be appreciated, it is generally desirable to reduce computational complexity and processing delays within a communication system. This is especially true within handheld and portable communication units that have limited processing capabilities and a limited supply of power (e.g., batteries). Therefore, there is a need for channel estimation techniques and structures that are computationally efficient while still providing accurate estimates.

DETAILED DESCRIPTION

Figure 1:
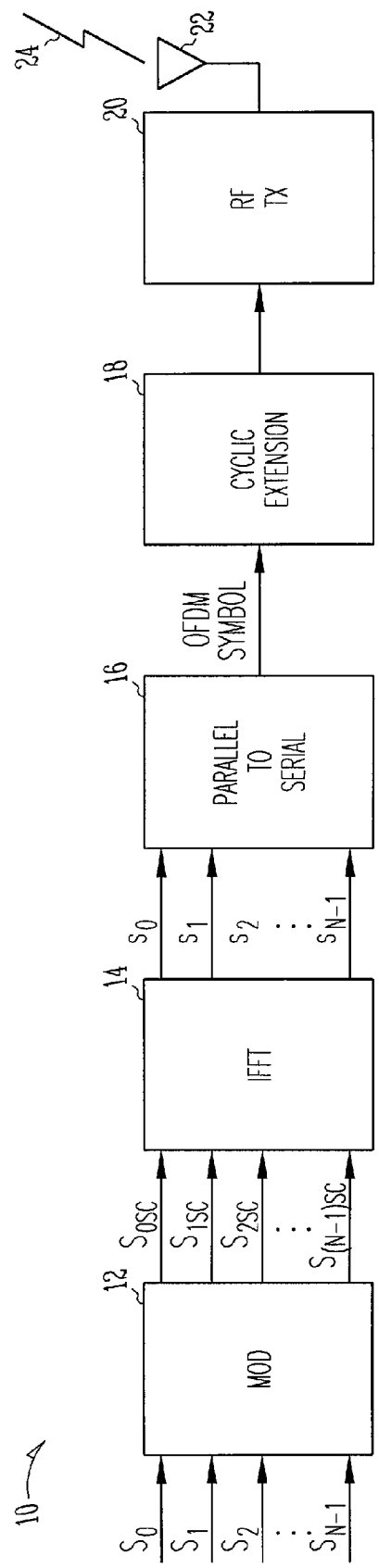
FIG. 1 is a block diagram illustrating a conventional orthogonal frequency division multiplexing (OFDM) transmitter.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The present invention relates to computationally efficient techniques and structures for providing channel estimation within a communication system implementing orthogonal frequency division multiplexing (OFDM). The techniques and structures are most useful when only a subset of the subcarriers within each OFDM symbol are of interest. In a system using subcarrier division multiplexing, for example, where subsets of the data subcarriers are assigned to users on a dynamic basis, a communication device associated with a particular user will only be interested in the subcarriers assigned to that user. In one approach, interpolation vectors are first obtained for each of the subcarriers of interest. A dot product is then calculated between each of the interpolation vectors and a pilot vector extracted from a received OFDM symbol. Each dot product results in an equalization coefficient for a corresponding subcarrier of interest. The equalization coefficients are then used to modify the subcarriers of interest within the received OFDM symbol to reduce or remove undesirable channel effects (e.g., frequency selective fading) from the symbol. In one approach, only a subset of the pilot symbols within each OFDM symbol are used to form the pilot vector. The inventive principles are particularly well suited for software implementation (e.g., soft-PHY architectures), although hardware and hybrid software/hardware realizations can also be provided.

Orthogonal frequency division multiplexing (OFDM) is a multi-carrier transmission technique that uses a plurality of orthogonal subcarriers to transmit information within an available spectrum. Because the subcarriers are orthogonal to one another, they can be spaced much more closely together within the available spectrum than, for example, the individual channels in a conventional frequency division multiplexing (FDM) system. That is, the orthogonality of the subcarriers prevents inter-subcarrier interference within the system. In a typical OFDM system, orthogonality is achieved by using subcarriers that each have a spectrum with a null at the center frequency of each of the other subcarriers. Before transmission, each of the subcarriers is modulated with a low rate data stream. Thus, the transmitted symbol rate of the OFDM system is low and the transmitted OFDM signal is highly tolerant to multipath delay spread within the channel. For this reason, many modern digital communication systems are turning to OFDM as a modulation scheme for signals that need to survive in environments having multipath reflections and/or strong interference. Many wireless communication standards have already adopted OFDM including, for example, IEEE Standard 802.11a, the digital video broadcasting T standard (DVB-T), and the high performance radio local area network standard (HiperLAN). In addition, several industry consortia, including the Broadband Wireless Internet Forum and the OFDM Forum, are proposing OFDM for fixed wireless access systems.

Before a description of the inventive principles is undertaken, a discussion of the basic operating characteristics of a conventional OFDM communication system is presented. It should be appreciated, however, that the inventive principles can be implemented in any communication system utilizing OFDM techniques and are not limited to use within systems or devices having the specific architectures described below.

FIG. 1 is a block diagram illustrating a conventional OFDM transmitter 10. In a typical scenario, the transmitter 10 will be part of a transceiver unit that is capable of supporting duplex communication within a wireless communication system. As illustrated, the transmitter 10 includes: a modulator 12, an inverse fast Fourier transform (IFFT) unit 14, a parallel to serial converter 16, a cyclic extension unit 18, a radio frequency (RF) transmit unit 20, and an antenna 22. The modulator 12 receives a plurality of symbols ($S_0$, $S_1$, $S_2$, ..., $S_{N-1}$) that need to be transmitted by the transmitter 10. The modulator 12 uses each of the input symbols to modulate a corresponding subcarrier of the OFDM system to generate a symbol modulated subcarrier (e.g., $S_{0SC}$, $S_{1SC}$, $S_{2SC}$, ..., $S_{(N-1)SC}$) at an output thereof. As described above, each of the subcarriers of the OFDM system is orthogonal to each of the other subcarriers to keep inter-subcarrier interference to a minimum. The modulator 12 can use any of a variety of modulation types to modulate the subcarriers (e.g., binary phase shift keying (BPSK), quadrature phase shift keying (QPSK), quadrature amplitude modulation (QAM), differentially coded star QAM (DSQAM), and others). In addition, the modulator 12 can use a different modulation type for each individual symbol or for different groups of symbols if desired.

The input symbols ($S_0$, $S_1$, $S_2$, $S_{N-1}$) are used to generate a single OFDM symbol to be transmitted by the transmitter 10. The symbol modulated subcarriers ($S_{0SC}$, $S_{1SC}$, $S_{2SC}$, ..., $S_{(N-1)SC}$) form a frequency domain representation of the OFDM symbol. The symbol modulated subcarriers are applied to the inputs of the IFFT 14 to generate a time domain representation of the OFDM symbol. As shown, the time domain representation of the OFDM symbol consists of a plurality of time domain samples ($s_0$, $s_1$, $s_2$, ..., $s_{N-1}$). Any form of inverse discrete Fourier transform (IDFT) can be used to perform the inverse transform operation. The IFFT is preferred, however, because it is the most computationally efficient method available. As is well known, the number of time domain samples generated by the IFFT 14 is equal to the number of frequency components input thereto (i.e., N).

Figure 2:
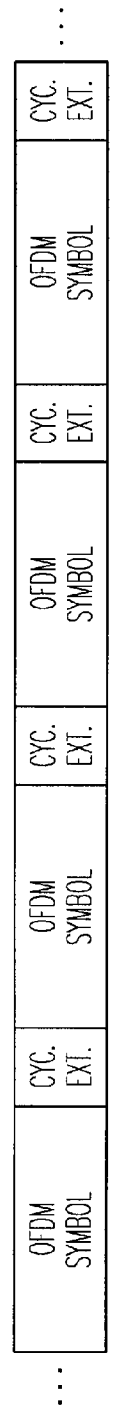
FIG. 2 is a signal diagram illustrating an OFDM symbol stream that may be transmitted from the transmitter of FIG. 1.

The samples output by the IFFT 14 are applied to the parallel to serial converter 16 which generates a sample stream representing the OFDM symbol. This serial OFDM symbol is transferred to the cyclic extension unit 18 which adds a cyclic extension (or guard interval) to the OFDM symbol. The cyclic extension is added to the OFDM symbol to prevent the occurrence of inter-symbol interference in the channel that can be caused by the channel's memory (i.e., multipath reflections). The cyclic extension usually consists of a plurality of samples (e.g., $N_G$ samples) that are copied from the end of the serial OFDM symbol and placed at the beginning of the symbol. The number of samples will typically depend upon the memory of the channel. It is typically desirable to use a cyclic extension having a length that is no more than 10% of the length of the OFDM symbol to maintain efficient (e.g., low overhead) operation. The cyclic extension unit 18 outputs each OFDM symbol and its corresponding cyclic extension in a continuous stream to the RF transmit unit 20. FIG. 2 is a diagram illustrating the stream output by the cyclic extension unit 18 in a typical application. The RF transmit unit 20 is operative for converting the OFDM symbol stream into a radio frequency signal for transmission into the wireless channel. To perform this function, the RF transmit unit 20 may include, for example, a digital to analog converter, a frequency conversion unit (e.g., an up converter), a power amplifier, and/or any other equipment required to generate an RF transmit signal. The output of the RF transmit unit 20 is delivered to the antenna 22 which transmits a radio frequency communication signal 24 into the channel. It should be appreciated that other processing functionality, such as error coding circuitry, may also be included within the OFDM transmitter 10.

Figure 3:
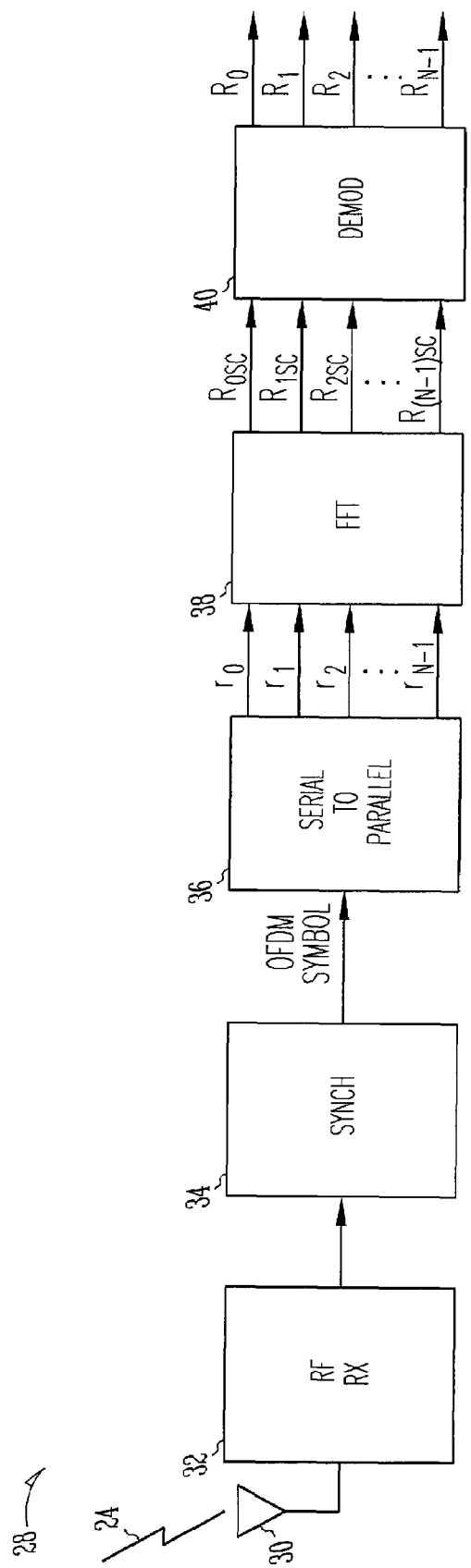
FIG. 3 is a diagram illustrating a conventional OFDM receiver.

FIG. 3 is a block diagram illustrating a conventional OFDM receiver 28. Like the transmitter 10 of FIG. 1, the receiver 28 will typically be part of a transceiver unit that is capable of supporting duplex communications within a wireless communication system. As illustrated, the receiver 28 includes: an antenna 30, an RF receive unit 32, a synchronization unit 34, a serial to parallel converter 36, an FFT unit 38, and a demodulation unit 40. The antenna 30 receives an RF communication signal 24 from the channel. The RF receive unit 32 converts the received RF signal to a format required for subsequent processing. The RF receive unit 32 may include, for example, a low noise amplifier, one or more frequency conversion units (e.g., a down converter), an analog to digital converter, and/or any other functionality required to achieve the desired signal format. The RF receive unit 32 transfers the received signal to the synchronization unit 34 which synchronizes the signal in a manner that allows the individual OFDM symbols within the signal to be recognized and the cyclic extensions to be discarded. The OFDM symbols are delivered one after the other to the serial to parallel converter 36 which converts each symbol into a parallel group of time domain samples ($r_0$, $r_1$, $r_2$, ..., $r_{N-1}$). The samples are input into the FFT unit 38 which generates a plurality of frequency domain symbol modulated subcarriers ($R_{0SC}$, $R_{1SC}$, $R_{2SC}$, ..., $R_{(N-1)SC}$). The symbol modulated subcarriers are then demodulated by the demodulator 40 to produce a plurality of symbols ($R_0$, $R_1$, $R_2$, ..., $R_{N-1}$).

The impulse response of the wireless channel (i.e., the channel impulse response or CIR) is typically assumed to be time-invariant for the duration of one OFDM symbol. Thus, the time domain convolution of the transmitted time domain signal with the CIR is equivalent to the multiplication of the spectrum of the transmitted signal with the frequency domain transfer function H(f) of the channel (which is simply the Fourier transform of the CIR). Each of the frequency domain symbol modulated subcarriers ($R_{0SC}$, $R_{1SC}$, $R_{2SC}$, ..., $R_{(N-1)SC}$) that are received by the receiver 28, therefore, is the product of a corresponding symbol modulated subcarrier ($S_{0SC}$, $S_{1SC}$, $S_{2SC}$, ..., $S_{(N-1)SC}$) of the transmitter 10 and an associated coefficient of the frequency domain transfer function H(f) of the channel, plus some additive channel noise (e.g., additive white Gaussian noise). This can be expressed in equation form as follows:

$$R_{nSC} = S_{nSC} \cdot H_n + n_n$$

where $R_{nSC}$ is the nth symbol-modulated subcarrier received in the receiver, $S_{nSC}$ is the nth symbol-modulated subcarrier transmitted by the transmitter, $H_n$ is the frequency domain channel transfer function coefficient corresponding to the nth subcarrier, and $n_n$ is a white Gaussian noise sample corresponding to the nth subcarrier. As coherent detection is assumed for the system, the received data symbols $R_{nSC}$ need to be de-faded in the frequency domain. Thus, an estimate of the frequency domain transfer function H(f) of the channel needs to be made.

Figure 4:
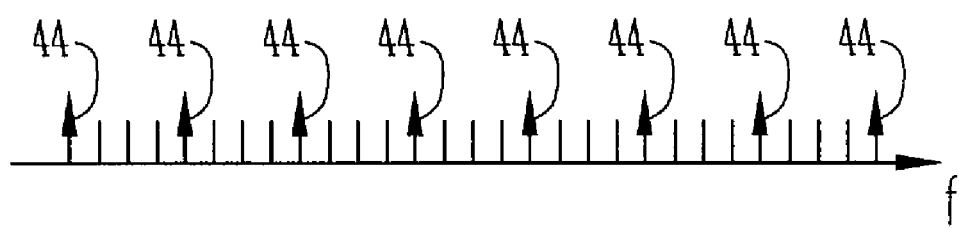
FIG. 4 is a diagram that is representative of the frequency spectrum of a typical OFDM symbol.

In a typical approach, the channel transfer function is estimated using pilot symbols that are included within the OFDM symbols transmitted by the transmitter 10. The pilot symbols are usually located at fixed frequency intervals within the OFDM symbols. FIG. 4 is a diagram illustrating the frequency spectrum of an OFDM symbol 42 having a plurality of subcarriers. As shown, every fourth subcarrier within the OFDM symbol 42 includes a pilot symbol 44 that can be used for channel estimation. The other subcarriers within the OFDM symbol 42 are used to carry user data symbols through the channel. The spacing of the pilot symbols 44 within a particular OFDM symbol will typically depend upon the specific system being implemented. Similarly, the overall number of subcarriers within each OFDM symbol will also be system specific. The location and content of the pilot symbols within the transmitted OFDM symbol will typically be known within the receiver.

When an OFDM symbol is received by the receiver 28, the pilot symbols are extracted from the received signal. The extracted pilot symbols include information about the frequency domain transfer function of the channel (e.g., coefficients) at the frequencies of the pilot carrying subcarriers. To obtain information about the frequency domain transfer function of the channel at the frequencies of the data carrying subcarriers, interpolation techniques are often used. In the simplest approach, linear interpolation is performed from pilot to pilot. This method provides reasonable performance as long as the inverse of the realized delay spread does not approach the pilot spacing. Often, however, the linear approach falls short of the performance levels required in modern communication systems.

In an "optimal" interpolation method, zero-padded FFTs (or DFTs) are used to fill in the missing transfer function coefficients. This method will typically result in the most accurate channel estimate available, but it is very computationally complex. For example, in a typical procedure, the pilots from a received OFDM symbol are input to an FFT to generate an array of values at an output of the FFT. The number of values within the array output by the FFT is equal to the number of pilots input to the FFT (i.e., M). A plurality of zeros is then added to the array of values to increase the total number of values to the number of subcarriers within the OFDM symbol (i.e., from M to N). This process is known as zero-padding. An inverse N-point FFT is then performed on the zero-padded array to achieve interpolated channel transfer function coefficients for all of the subcarriers. These coefficients can then be used to perform channel equalization for the data carrying subcarriers within the received OFDM symbol on a subcarrier by subcarrier basis (e.g., by simple division).

In conceiving the present invention, it was appreciated that many situations exist where only a subset of the subcarriers within a particular OFDM symbol are of interest. For example, in an OFDM system where orthogonal frequency division multiple access (OFDMA) is being utilized, individual users are each assigned subsets of the subcarriers on a dynamic basis. Thus, the communication equipment associated with a particular user (e.g., a handheld communicator) will only be concerned with the corresponding subcarriers assigned to that user and not the entire subcarrier array. In a similar example, a basestation in an OFDM system implementing OFDMA will typically receive OFDM signals from multiple user terminals concurrently. The base station must then estimate the channel associated with each user terminal separately. Each channel estimation, therefore, is only concerned with the subcarriers of interest for the corresponding user terminal. Other situations also exist where only a subset of the subcarrier array is of interest. In these situations, it will often be inefficient to perform the computationally complex optimal interpolation technique described above to determine equalization coefficients for the subcarriers of interest. Therefore, in accordance with the present invention, techniques are presented that are capable of providing a significant reduction in the computational complexity associated with channel estimation (i.e., with respect to the optimal interpolation approach) when only a subset of subcarriers within an OFDM symbol are of interest. The techniques of the present invention will typically provide a performance level between that of the linear interpolation method and the optimal interpolation method (often closer to the optimal method).

The reduced complexity channel estimation techniques of the present invention are derived from the optimal interpolation approach described above. In the optimal approach, a pilot vector having a length M (extracted from a received OFDM symbol) is transformed into a vector of length N using zero padded FFTs (or DFTs). An M-point FFT is first performed on the pilot vector $x_n$ as follows:

$$X_f = \sum_{n=0}^{M-1} x_n \cdot e^{-j2\pi f n/M}$$

where $X_f$ are the frequency domain coefficients output by the FFT, M is the number of pilots in the pilot vector, n is the time index, and f is the frequency index. The resulting group of coefficients $X_f$ is then zero-padded to length N (i.e., total number of subcarriers within the OFDM symbol) with the zeros inserted in the high frequency (center) terms. An N-point inverse FFT (or DFT) is then performed on the zero-padded array to generate a plurality of interpolated equalization coefficients $x_n'$ that can be described as follows:

$$\hat{x}_n = \sum_{f=0}^{(M/2)-1} X_f \cdot e^{j2\pi f n/N} + \sum_{f=N-(M/2)}^{N-1} X_{f-N+M} \cdot e^{j2\pi f n/N}$$

The subscript of X has been modified in the second summation of this equation to conform to the original, non-zero padded indicies described above. Substituting the second equation into the first and expanding the result yields:

$$\hat{x}_k = e^{j\cdot 0} \cdot \sum_n x_n \cdot e^{-j\cdot 0} + e^{j2\pi k/N} \cdot \sum_n x_n \cdot e^{-j2\pi n/M} + e^{j2\pi k 2/N} \cdot \sum_n x_n \cdot e^{-j2\pi n 2/M} +$$
$$\ldots + e^{j2\pi((M/2)-1)k/N} \cdot \sum_n x_n \cdot e^{-j2\pi n((M/2)-1)/M} +$$
$$e^{j2\pi(N-(M/2))} \cdot \sum_n x_n \cdot e^{-j2\pi n(N-(M/2)-N+M)/M} +$$
$$\ldots + e^{j2\pi(N-1)k/N} \cdot \sum_n x_n \cdot e^{-j2\pi n(M-1)/M}$$

where the index k has been introduced to distinguish the indicies of x' from the indicies of x. It was determined by rearranging the terms of this equation (to combine $x_n$) that each element of x' is simply the dot product of x (the pilot vector) with an interpolation vector I having length M. For arbitrary k and N, the interpolation vector I can be calculated as follows:

$$I_n = \sum_{i=0}^{M-1} e^{j2\pi i((k/N)-n/M))} + \sum_{i=N-(M/2)}^{N-1} e^{j2\pi((i\cdot k/N)-((i-N-M)\cdot n/M))}$$

In accordance with one aspect of the present invention, a plurality of interpolation vectors are predetermined (using the above equation or some variant thereof) and stored within a communication device. When an OFDM symbol is received by the communication device, a pilot vector is extracted from the OFDM symbol. Interpolation vectors are then retrieved for each subcarrier of interest within the communication device and a dot product is calculated between the pilot vector and each of the retrieved interpolation vectors. Each dot product results in an equalization coefficient for a corresponding subcarrier of interest. This basic approach will be referred to herein as the vector interpolation method (VIM). The equalization coefficients resulting from the dot products are then used to equalize the associated subcarrier signals within the OFDM symbol (e.g., by division). As long as the subcarriers of interest remain unchanged, the same interpolation vectors can be used to process each OFDM symbol received from the channel.

The VIM offers a computational flexibility that was not previously available using the optimal interpolation approach. For example, the VIM allows flexibility in block size (i.e., the number of subcarriers computed) and pilot vector size that was not previously available. Using the VIM, an OFDM communication system can be implemented that allows the number of subcarriers assigned to each user to be dynamically varied during system operation. Similarly, an OFDM system can be provided that allows the total number of subcarriers and/or pilot symbols within each OFDM symbol to be dynamically varied. Theoretically, the optimal interpolation method can be performed with only a subset of the pilot symbols within an OFDM symbol to reduce computational complexity. However, to dynamically vary the size of the pilot vector used to perform optimal interpolation during system operation, block processing elements (e.g., FFTs) would have to be available for each expected vector size. As dedicated hardware is typically used to perform the FFTs using the optimal approach, this could easily become cost prohibitive. For this reason, systems implementing the optimal approach typically employ the entire array of pilots to perform the interpolation. For a given number of pilots used, the optimal method and the VIM will provide identical performance. However, when the number of subcarriers to be interpolated is a subset of those traversed by the pilot tones used in the channel estimation, a significant computation benefit is achieved by using the VIM. Thus, the VIM allows channel estimation to be performed only in the region of the subcarriers of interest in a relatively simple and dynamic fashion, usually with a reduced computational requirement. In addition, the VIM is particularly well suited for implementation within a soft-PHY architecture.

Figure 5:
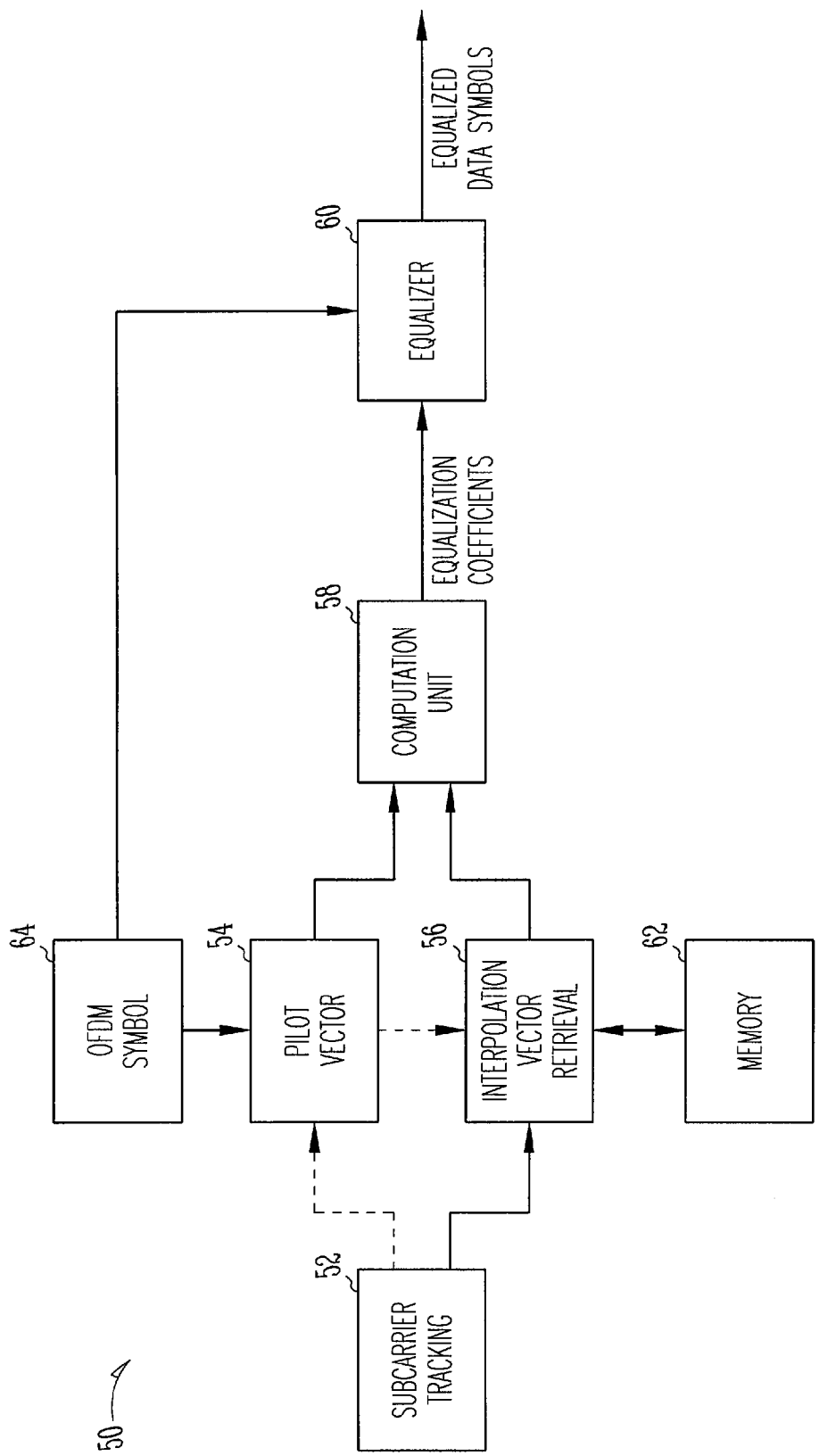
FIG. 5 is a block diagram illustrating an OFDM equalization subsystem in accordance with one embodiment of the present invention.

FIG. 5 is a block diagram illustrating an OFDM equalization subsystem 50 in accordance with one embodiment of the present invention. The subsystem 50 will typically be implemented as part of a wireless receiver (e.g., receiver 28 of FIG. 3) in an OFDM communication system. In a multi-user basestation scenario, a separate equalization subsystem 50 can be provided for each user currently communicating with the basestation. It should be appreciated that the individual blocks within the block diagram do not necessarily correspond to discrete hardware structures. For example, one or more of the blocks (or all of the blocks) may be implemented in software within a digital processing device.

As illustrated, the equalization subsystem 50 includes: a subcarrier tracking unit 52, a pilot vector unit 54, an interpolation vector retrieval unit 56, a computation unit 58, an equalizer 60, and a memory 62. The subcarrier tracking unit 52 tracks the current subcarriers of interest for the subsystem 50. The pilot vector unit 54 extracts a number of pilot symbols from a recently received OFDM symbol 64 to form a pilot vector. The interpolation vector retrieval unit 56 retrieves a plurality of interpolation vectors corresponding to the subcarriers of interest identified by the subcarrier tracking unit 52 from the memory 62. As will be described in greater detail, the interpolation vector retrieval unit 56 may use information about the pilot symbols within the pilot vector to determine which interpolation vectors to retrieve. The computation unit 58 uses the pilot vector from the pilot vector unit 54 and the interpolation vectors from the interpolation vector retrieval unit 56 to generate a plurality of equalization coefficients for delivery to the equalizer 60. The equalizer 60 then uses the equalization coefficients generated by the computation unit 58 to equalize each of the subcarriers of interest within the corresponding OFDM symbol 64. This procedure is repeated for each OFDM symbol received.

As described above, the subcarrier tracking unit 52 is operative for tracking the subcarriers of interest within the equalization subsystem 50. To do this, the subcarrier tracking unit 52 will typically need to determine which subcarriers are presently assigned to a user associated with the subsystem 50. In a basestation that is servicing multiple users within the OFDM system, a separate equalization subsystem 50 may be provided for each currently connected user. The subcarrier tracking unit 52 within each subsystem 50 would thus track the subcarriers assigned to the corresponding user. The subcarrier tracking unit 52 will output an indication of the present subcarriers of interest to the interpolation vector retrieval unit 56 and possibly the pilot vector unit 54. In at least one approach, the number and location of the subcarriers of interest associated with a particular user can change with time. The subcarriers of interest associated with a particular user are not necessarily adjacent to one another within the OFDM symbol.

Figure 6:
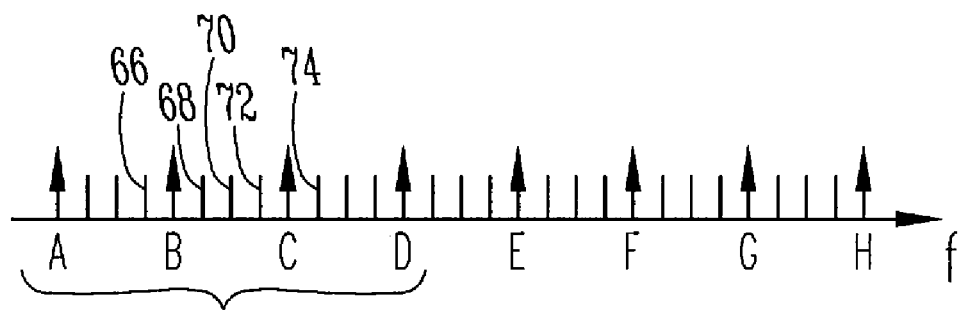
FIG. 6 is a diagram illustrating the selection of pilot symbols from an OFDM symbol based on a plurality of subcarriers of interest in accordance with one embodiment of the present invention.

In one embodiment of the present invention, the pilot vector generated by the pilot vector unit 54 includes all of the pilot symbols from the present OFDM symbol 64. In a preferred approach, however, the pilot vector unit 54 includes selection functionality for dynamically selecting a subset of pilot symbols within the OFDM symbol 64 to be used to form the pilot vector (i.e., to perform the interpolation). By using a subset of pilot symbols, computational complexity can be reduced considerably. However, as discussed previously, a reduction in equalization performance will usually be experienced. In this regard, a tradeoff can be made between performance and computational efficiency. The subset of pilot symbols that is used within the vector interpolation calculations should envelope all of the subcarriers of interest being processed. For example, with reference to FIG. 6, if subcarriers 66, 68, 70, 72, and 74 are presently of interest, then at least pilot symbols A, B, C, and D should be used in the interpolation. The pilot vector unit 54 can determine which of the pilot symbols to use for a particular set of subcarriers of interest based on the interpolation vectors that are known to be available within the memory 62.

The memory 62 will include a plurality of interpolation vectors for use during the channel estimation process. The interpolation vectors can all have the same length or a plurality of different length interpolation vectors can be provided. The interpolation vectors will typically be calculated a priori using the interpolation vector equation described above or a similar equation. In a system where the number and arrangement of the subcarriers of interest can vary, the length of the corresponding pilot vectors may also vary. In this scenario, interpolation vectors can be stored in the memory 62 for each subcarrier within each possible pilot vector arrangement. The interpolation vector retrieval unit 56 retrieves the appropriate interpolation vectors from the memory 62 based on the subcarriers identified by the subcarrier tracking unit 52. If the pilot vector unit 54 dynamically selects pilot symbols for the pilot vector, the interpolation vector retrieval unit 56 will also use information about the present pilot vector to retrieve the appropriate interpolation vectors. As described previously, the retrieved interpolation vectors will each have the same length as the pilot vector assembled by the pilot vector unit 54. In a preferred approach, the computation unit 58 calculates a separate dot product between the pilot vector and each of the retrieved interpolation vectors. The result of each dot product is the equalization coefficient for the corresponding subcarrier of interest. The equalizer 60 equalizes the subcarriers of interest within the present OFDM symbol 64 by dividing each subcarrier by the corresponding equalization coefficient. The equalized data symbols are then output for further processing.

Figure 7:
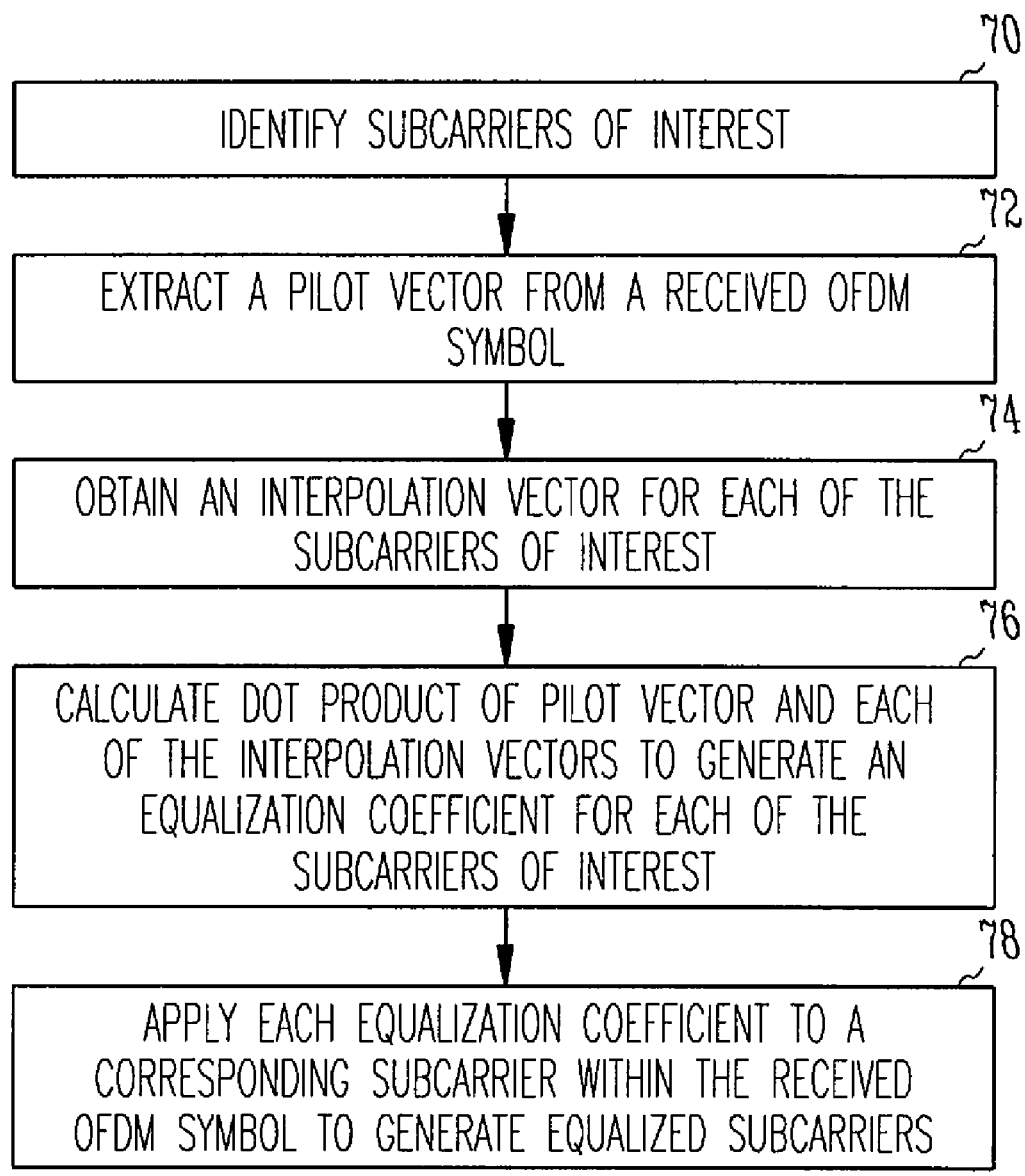
FIG. 7 is a flowchart illustrating a method for performing channel estimation and equalization in an OFDM communication system in accordance with one embodiment of the present invention.

FIG. 7 is a flowchart illustrating a method for performing channel estimation and equalization in an OFDM communication system in accordance with one embodiment of the present invention. A plurality of subcarriers of interest are first identified (block 70). A pilot vector is then extracted from a received OFDM symbol (block 72). The pilot vector can include all of the pilot symbols from the OFDM symbol or a subset thereof. In at least one embodiment, pilot symbols are chosen for the pilot vector based on the quantity and location of the subcarriers of interest. An interpolation vector is obtained for each of the identified subcarriers of interest (block 74). In a preferred approach, the interpolation vectors are retrieved from a memory within the corresponding communication unit. However, other methods for obtaining the interpolation vectors can also be used. A dot product is next calculated between the pilot vector and each of the interpolation vectors (block 76). Each dot product results in an equalization coefficient for a corresponding subcarrier of interest. Each equalization coefficient is then applied to a corresponding subcarrier within the received OFDM symbol (block 78). This process is repeated for each OFDM symbol received.

It should be appreciated that the principles of the present invention can be beneficially implemented in any receiver unit used within an OFDM-based communication system. The receiver unit can be located, for example, within a multi-user basestation, a single user handheld communicator, a satellite uplink, downlink, or crosslink transceiver, a transceiver supporting a terrestrial wireless link, mobile transceivers within ad hoc networks, and in a wide variety of other communication device types. The inventive principles have application in both wireless and wired systems, although wireless systems will typically derive the greatest benefit.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method comprising:
   receiving an OFDM symbol using a communication device, wherein the OFDM symbol includes a plurality of data subcarriers and a plurality of pilot symbols;
   assigning a subset of the data subcarriers to a user terminal on a dynamic basis, wherein those data subcarriers assigned to user terminals are subcarriers of interest;
   extracting a pilot vector from the OFDM symbol using a subset of the pilot symbols;
   identifying subcarriers of interest in the OFDM symbol;
   retrieving a stored interpolation vector for each subcarrier of interest;
   generating an equalization coefficient for each subcarrier of interest by calculating a dot product between the pilot vector and each of the retrieved interpolation vectors; and
   modifying the subcarriers of interest within the received OFDM symbol using the equalization coefficients.

2. The method of claim 1, further comprising dynamically varying the number of data subcarriers assigned to the user terminal during operation of the communication device.

3. The method of claim 2, also further comprising dynamically varying the number of subcarriers in each of a plurality of OFDM symbols,
   wherein receiving an OFDM symbol includes receiving the plurality of OFDM symbols, and
   wherein identifying subcarriers of interest in the OFDM symbols includes identifying a varying number of data subcarriers assigned to the user terminal.

4. The method of claim 1, also further comprising dynamically varying the number of pilot symbols in each OFDM symbol.

5. The method of claim 1, wherein retrieving a stored interpolation vector for each subcarrier of interest also includes:
   predetermining an interpolation vector for each subcarrier of interest; and
   storing the interpolation vector in a memory of the communication device.

6. The method of claim 5, wherein predetermining the interpolation vector includes calculating the interpolation vector $I_n$ according to $$I_n = \sum_{i=0}^{M-1} e^{j2\pi i((k/N)-n/M))} + \sum_{i=N-(M/2)}^{N-1} e^{j2\pi((i\cdot k/N)-((i-N-M)\cdot n/M))},$$

where M is the length of the interpolation vector, N is the number of subcarriers in the OFDM symbol.

7. A communication device, for use in a communication system implementing orthogonal frequency division multiplexing (OFDM), comprising:
- a receiver subsystem configured to receive an OFDM symbol from a communication channel, wherein the OFDM symbol includes a plurality of data subcarriers, and
- an equalization subsystem including:
    - a pilot vector unit configured to extract a pilot vector from the OFDM symbol;
    - a subcarrier tracking unit configured to track subcarriers of interest, wherein subcarriers of interest are those data subcarriers assigned to user terminals on a dynamic basis;
    - an interpolation vector retrieval unit configured to retrieve an interpolation vector stored in a memory for each subcarrier of interest; and
    - a computation unit configured to generate an equalization coefficient for each subcarrier of interest by calculating a dot product between the pilot vector and each retrieved interpolation vector and to modify the subcarriers of interest within the received OFDM symbol using the equalization coefficients.

8. The communication device of claim 7, wherein the computation unit is configured to equalize a subcarrier of interest using an equalization coefficient to determine a channel estimate.

9. The communication device of claim 7, wherein the computation unit is configured to divide a subcarrier of interest by an equalization coefficient to remove undesired channel effects from the OFDM symbol.

10. The communication device of claim 7, wherein the computation unit includes a soft-PHY architecture processor to calculate the dot product of the pilot vector and an interpolation vector.

11. The communication device of claim 7, wherein the subcarrier tracking unit is configured to track a varying number of data subcarriers assigned to a user terminal.

12. The communication device of claim 7, wherein the pilot vector unit is configured to extract pilot vectors from a plurality of OFDM symbols having a varying number of pilot symbols.

13. The communication device of claim 7, wherein the subcarrier tracking unit is configured to track a varying number of subcarriers of interest in each of a plurality OFDM symbols.

14. The communication device of claim 7, also including a memory to store a predetermined interpolation vector for each subcarrier of interest.

15. A radio frequency (RF) transceiver comprising:
- a receiver subsystem configured to receive an orthogonal frequency division multiplexing (OFDM) symbol from a communication channel, wherein the OFDM symbol includes a plurality of data subcarriers; and
- an equalization subsystem including:
    - a pilot vector unit configured to extract a pilot vector from the OFDM symbol;
    - a subcarrier tracking unit configured to track subcarriers of interest, wherein a subset of the plurality of data subcarriers are dynamically assigned to a user terminal, and wherein the subcarriers of interest are those data subcarriers assigned to user terminals;
    - a flash memory to store a predetermined interpolation vector for each subcarrier of interest;
    - an interpolation vector retrieval unit configured to retrieve a interpolation vector for each subcarrier of interest from the flash memory; and
    - a computation unit configured to generate an equalization coefficient for each subcarrier of interest by calculating a dot product between the pilot vector and each of the retrieved interpolation vectors and modify the subcarriers of interest within the received OFDM symbol using the equalization coefficients.

16. The radio frequency (RF) transceiver of claim 15, wherein the subcarrier tracking unit is configured to track a varying number of data subcarriers assigned to a user terminal, wherein the data subcarriers assigned to a user are non-adjacent to one another in the OFDM symbol.

17. The radio frequency (RF) transceiver of claim 16, wherein the computation unit is configured to equalize the non-adjacent data subcarriers assigned to the user terminal using the equalization coefficients.

* * * * *